US008005854B2

(12) United States Patent  
Chawla et al.

(10) Patent No.: US 8,005,854 B2  
(45) Date of Patent: Aug. 23, 2011

(54) SYSTEM WITH METHODOLOGY FOR EXECUTING RELATIONAL OPERATIONS OVER RELATIONAL DATA AND DATA RETRIEVED FROM SOAP OPERATIONS

(75) Inventors: Rajesh Chawla, Arvada, CO (US); Steve Olson, Sanbornton, NH (US)

(73) Assignee: Sybase, Inc., Dublin, CA (US)

( * ) Notice: Subject to any disclaimer, the term of this patent is extended or adjusted under 35 U.S.C. 154(b) by 1166 days.

(21) Appl. No.: 10/707,471

(22) Filed: Dec. 16, 2003

(65) Prior Publication Data

US 2004/0181537 A1    Sep. 16, 2004

Related U.S. Application Data

(60) Provisional application No. 60/320,009, filed on Mar. 14, 2003.

(51) Int. Cl.
  *G06F 7/00* (2006.01)
  *G06F 17/30* (2006.01)

(52) U.S. Cl. ........................................................ 707/769

(58) Field of Classification Search .................. 707/100, 707/769, 999.1
  See application file for complete search history.

(56) References Cited

U.S. PATENT DOCUMENTS

| | | | |
|---|---|---|---|
| 6,061,692 A | 5/2000 | Thomas et al. ................ 707/200 |
| 6,484,185 B1 | 11/2002 | Jain et al. ....................... 707/203 |
| 6,792,605 B1 | 9/2004 | Roberts et al. ................. 719/313 |
| 6,799,182 B2 * | 9/2004 | Bata ............................... 707/101 |
| 6,804,819 B1 | 10/2004 | Bates et al. .................... 719/318 |
| 6,817,008 B2 | 11/2004 | Ledford et al. ................ 717/102 |
| 6,820,078 B2 | 11/2004 | Nip ..................................... 707/3 |
| 6,832,366 B2 | 12/2004 | Kouznetsov et al. .......... 717/106 |
| 7,133,907 B2 * | 11/2006 | Carlson et al. ................. 709/220 |
| 2003/0093436 A1 * | 5/2003 | Brown et al. .............. 707/103 Z |
| 2003/0126136 A1 * | 7/2003 | Omoigui .......................... 707/10 |
| 2005/0044164 A1 * | 2/2005 | O'Farrell et al. .............. 709/213 |

OTHER PUBLICATIONS

Portions of U.S. Appl. No. 60/442,810 of US PGPub 2005/0044164 to O'Farrell et al.*

* cited by examiner

*Primary Examiner* — Kimberly Lovel
(74) *Attorney, Agent, or Firm* — Sterne, Kessler, Goldstein & Fox P.L.L.C.

(57) ABSTRACT

A system with methodology for performing relational operations over relational data and data retrieved from Simple Object Access Protocol (SOAP) operations is described. In one embodiment, a method of the present invention is described for performing database operations on data obtained from a web service, the method comprises steps of: creating at least one proxy table in a database, each proxy table mapping to a method of the web service; in response to a database operation on a particular proxy table, converting the database operation into a format for invoking a particular method of the web service based upon the corresponding mapping; invoking the particular method of the web service; converting results obtained from invoking the particular method into data for use at the database based upon the corresponding mapping; and performing the database operation on the data at the database.

50 Claims, 6 Drawing Sheets

SYSTEM WITH METHODOLOGY FOR EXECUTING RELATIONAL OPERATIONS OVER RELATIONAL DATA AND DATA RETRIEVED FROM SOAP OPERATIONS

CROSS REFERENCE TO RELATED APPLICATIONS

The present application is related to and claims the benefit of priority of the following commonly-owned, presently-pending provisional application(s): application Ser. No. 60/320,009, filed Mar. 14, 2003, entitled "System with Methodology for Executing Relational Operations over Relational Data and Data Retrieved from SOAP Operations", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Dec. 4, 2003, 9:17 am, size: 54.5 KB; Object ID: File No. 1; Object Contents: Source Code.

BACKGROUND OF INVENTION

1. Field of the Invention

The present invention relates generally to information processing environments and, more particularly, to improved methods for executing relational operations over relational data and data retrieved from SOAP operations.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Volumes I and II", Addison Wesley, 1990; the disclosure of which is hereby incorporated by reference.

A new key open standard that addresses the cost and complexity of software integration is the Simple Object Access Protocol (SOAP). SOAP is a popular way to make remote method calls to classes and objects that exist on a remote server. SOAP relies on the popular XML protocol to define the format of the information and then adds the necessary HTTP headers to send it. XML (Extensible Markup Language) is itself a basic format for representing data. By specifying a standard way to encode parameters and return values in XML, and standard ways to pass them over some common network protocols like HTTP, SOAP provides a way for applications to communicate with each other over the Internet in a manner that is independent of platform. This enables the creation of various "web services"—that is, applications or components that are self-contained, self-describing modular applications that can be published, located, and invoked across the Internet.

The issue is how to use existing tools and data models provided in current relational database management systems to access and work with data that is retrieved using SOAP. Existing solutions which enable current database systems to work (at least to some extent) with data retrieved using SOAP all have limitations. These existing solutions include creating a database stored procedure that translates data retrieved from a specific SOAP invocation to relational data. Another solution is to create a user defined function in order to emulate a web service. Other possible solutions include modifying the web (SOAP) service to return relational data or creating custom code that retrieves SOAP data (and possibly relational data as well) and performs a specific relational operation on the data.

Disadvantages of these existing solutions include that several of the above solutions require a developer to program a custom application or solution (e.g., modify a SOAP web service) in order to access and perform relational operations on data retrieved using SOAP operations. Also, existing solutions may not work properly on data retrieved using SOAP with all relational operations (e.g., JOIN and UNION). In addition, existing solutions may not support other typical database operations, such as the ability to create views based on the data retrieved using SOAP.

What is needed is a solution for automatically and transparently mapping data retrieved from SOAP operations into relational database management systems, thereby allowing relational operations to be performed over the data. The solution should not require custom programming to access and work with SOAP data, nor should it require modifications to the existing database repository or SOAP (web) service. Ideally, the solution should also provide the ability to perform database optimizations based on network performance of the SOAP (web) service. The present invention fulfills these and other needs.

SUMMARY OF INVENTION

A system with methodology for performing relational operations over relational data and data retrieved from Simple Object Access Protocol (SOAP) operations is described. In one embodiment, a method of the present invention is described for performing database operations on data obtained from a web service, the method comprises steps of: creating at least one proxy table in a database, each proxy table mapping to a method of the web service; in response to a database operation on a particular proxy table, converting the database operation into a format for invoking a particular method of the web service based upon the corresponding mapping; invoking the particular method of the web service; converting results obtained from invoking the particular method into data for use at the database based upon the corresponding mapping; and performing the database operation on the data at the database.

In another embodiment, a system of the present invention is described for performing operations at a database on data obtained from a remote service, the system comprises: a mapping module for creating database tables representing at least some methods of a remote service accessed through a defined interface; an invocation module for converting a database operation on a database table representing a method of the remote service into a call for invoking the method; a communication module for transmitting the call for invoking the method to the remote service, and returning result values from invoking the method to the database; and a conversion module for converting result values received from the method into database format.

In yet another embodiment, in a database system, a method of the present invention is described for performing database queries on data available from an application, the method comprises steps of: establishing communication between a database and an application having an interface; creating database tables to represent at least some functions of the application based on the interface, each database table corresponding to a function of the application; in response to a database query received on a database table corresponding to a function of the application, generating input arguments expected by the function based on the database query; invoking the function with the input arguments and receiving results from invoking the function; converting the results into a database result set; and returning the database result set in response to the database query.

DETAILED DESCRIPTION

Glossary

Figure 1:
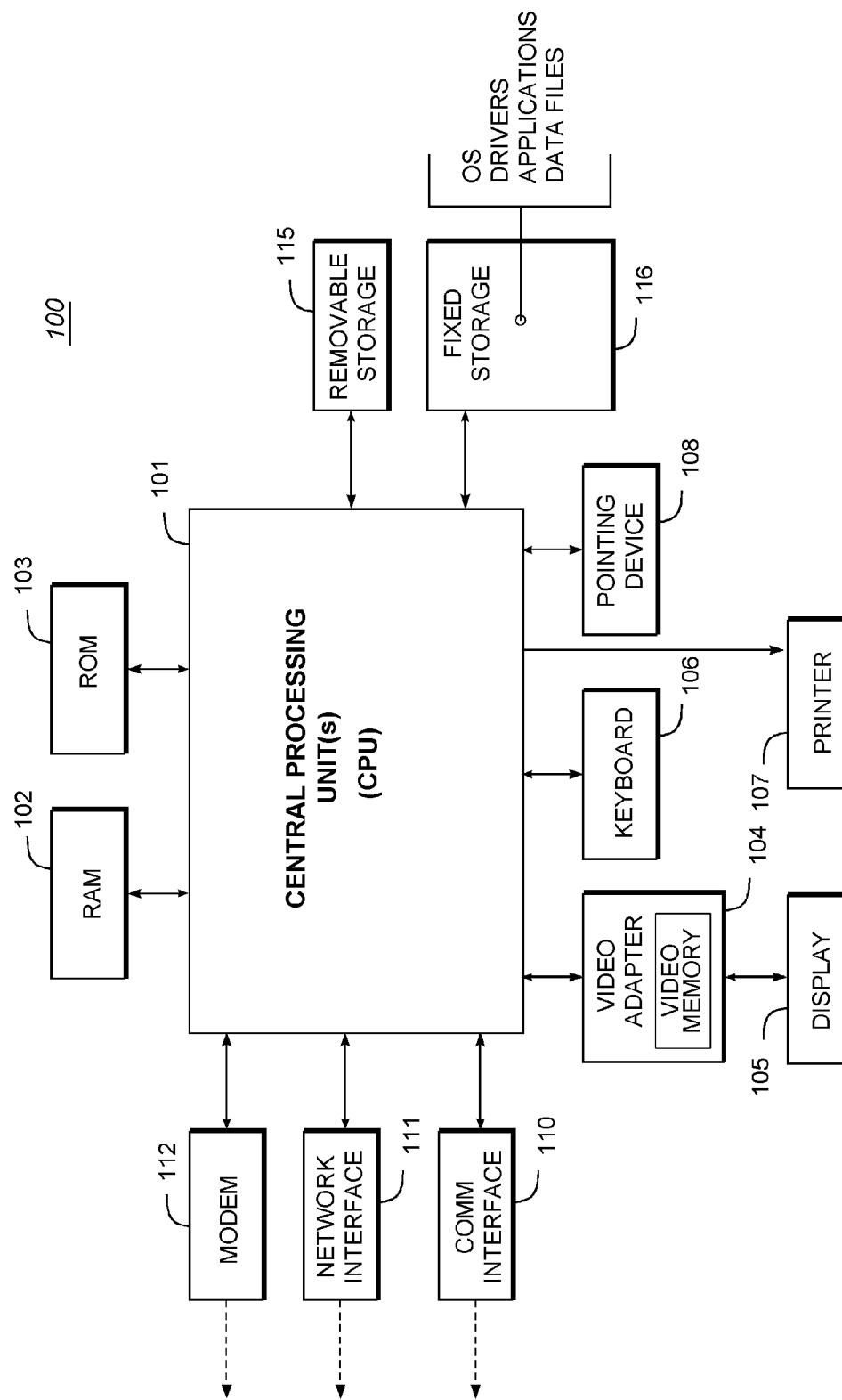
FIG. 1 is a very general block diagram of a computer system in which software-implemented processes of the present invention may be embodied.

The following definitions are offered for purposes of illustration, not limitation, in order to assist with understanding the discussion that follows.

HTTP: HTTP is the acronym for HyperText Transfer Protocol, which is the underlying communication protocol used by the World Wide Web on the Internet. HTTP defines how messages are formatted and transmitted, and what actions web servers and browsers should take in response to various commands. For example, when a user enters a URL in his or her browser, this actually sends an HTTP command to the web server directing it to fetch and transmit the requested web page. Further description of HTTP is available in "RFC 2616: Hypertext Transfer Protocol—HTTP/1.1", the disclosure of which is hereby incorporated by reference. RFC 2616 is available from the Internet Engineering Task Force (IETF), and is available via the Internet (e.g., currently at www.ietf.org/rfc/rfc2616.txt). Additional description of HTTP is available in the technical 20 and trade literature, see e.g., Stallings, W. "The Backbone of the Web", BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper", Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.1", from Sun Microsystems, the disclosure of which is hereby incorporated by reference. A copy of this documentation is available via the Internet (e.g., currently at java.sun.com/j2se/1.4.1/docs/index.html).

SGML: SGML stands for Standard Generalized Markup Language, a system for organizing and tagging elements of a document. SGML was developed and standardized by the International Organization for Standardization (ISO), see e.g., International Organization for Standardization, ISO 8879: "Information processing—Text and office systems—Standard Generalized Markup Language (SGML)", ([Geneva]: ISO, 1986), the disclosure of which is hereby incorporated by reference. SGML itself does not specify any particular formatting; rather, it specifies the rules for tagging elements. These tags can then be interpreted to format elements in different ways. For an introduction to SGML, see e.g., "A Gentle Introduction to SGML", 1995, chapter 2 of "Guidelines for Electronic Text Encoding and Interchange (TEI)" produced by the Text Encoding Initiative, the disclosure of which is hereby incorporated by reference. A copy of "A Gentle Introduction to SMGL" is available via the Internet (e.g., currently at www.uic.edu/orgs/tei/sgml/teip3sg/SG.htm).

SOAP: SOAP stands for Simple Object Access Protocol, which is a standard and lightweight protocol for exchanging information in a decentralized, distributed environment. It uses XML to encode remote procedure calls and typically uses HTTP as a communications protocol. For more information about SOAP, see e.g., "SOAP Version 1.2 Part 1:

Messaging Framework" and "SOAP Version 1.2 Part 2: Adjuncts", both World Wide Web Consortium (W3C) candidate recommendations dated Dec. 19, 2002, the disclosure of which are hereby incorporated by reference. Copies of these documents are available from the W3C, and are available via the Internet (e.g., currently at www.w3.org/2002/ws).

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Volumes I and II", Addison Wesley, 1990, the disclosure of which is hereby incorporated by reference.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Protocol", available from the IETF, the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", available from the IETF, the disclosure of which is hereby incorporated by reference. A copy of RFC 1180 is available via the Internet (e.g., currently at www.ietf.org/rfc/rfc1180.txt).

URL: URL is an abbreviation of Uniform Resource Locator, the global address of documents and other resources on the World Wide Web. The first part of the address indicates what protocol to use, and the second part specifies the IP address or the domain name where the resource is located.

WSDL: WSDL is an abbreviation of Web Services Description Language, which is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. For further description of WSDL, see e.g., "Web Services Description Language (WSDL) 1.1" (Mar. 15, 2001), available from the W3C. A copy of this document is available via the Internet (e.g., currently at www.w3.org/TR/wsdl).

XML: XML stands for Extensible Markup Language, a specification developed by the World Wide Web Consortium (W3C). XML is a pared-down version of SGML, designed especially for web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
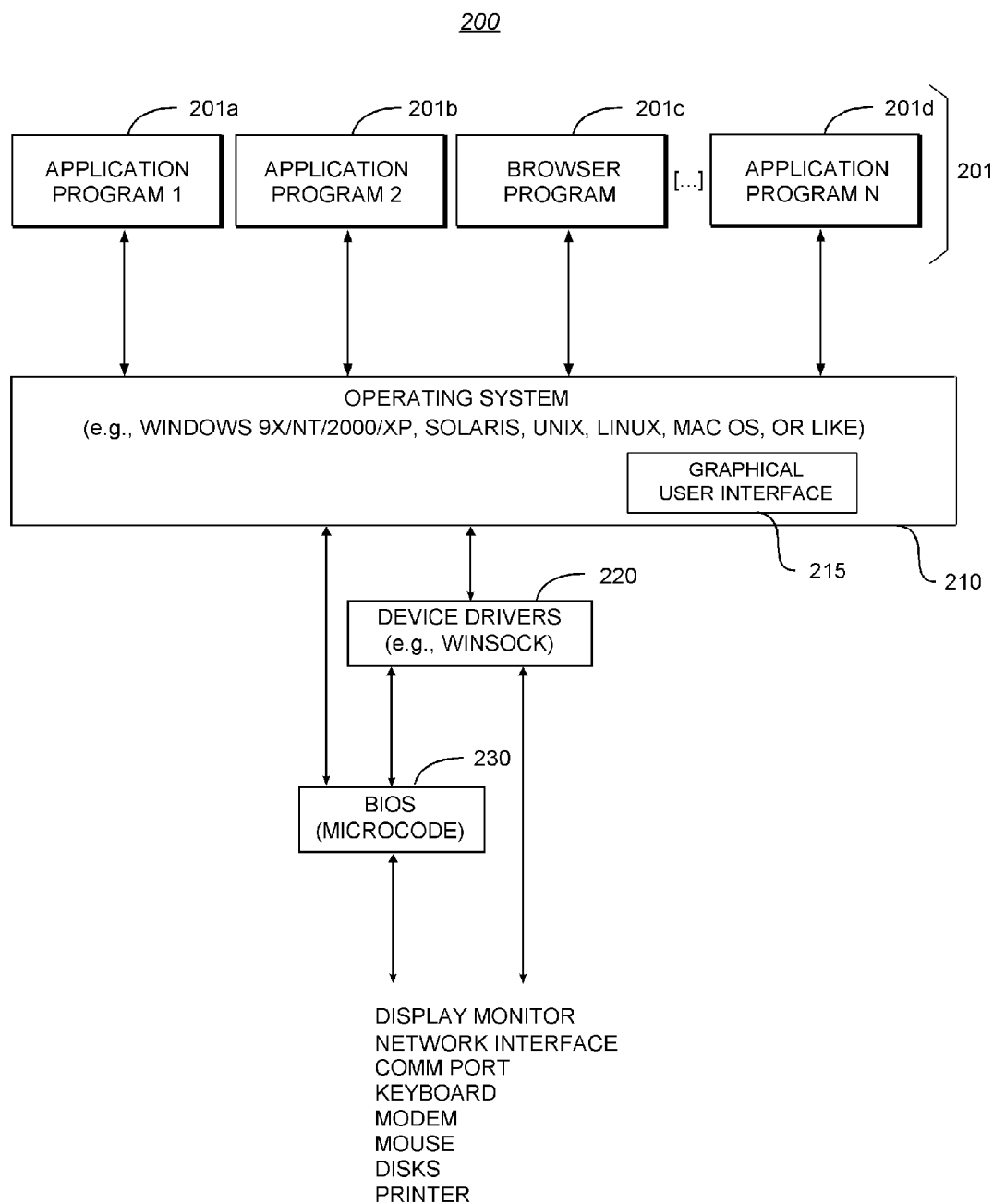
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
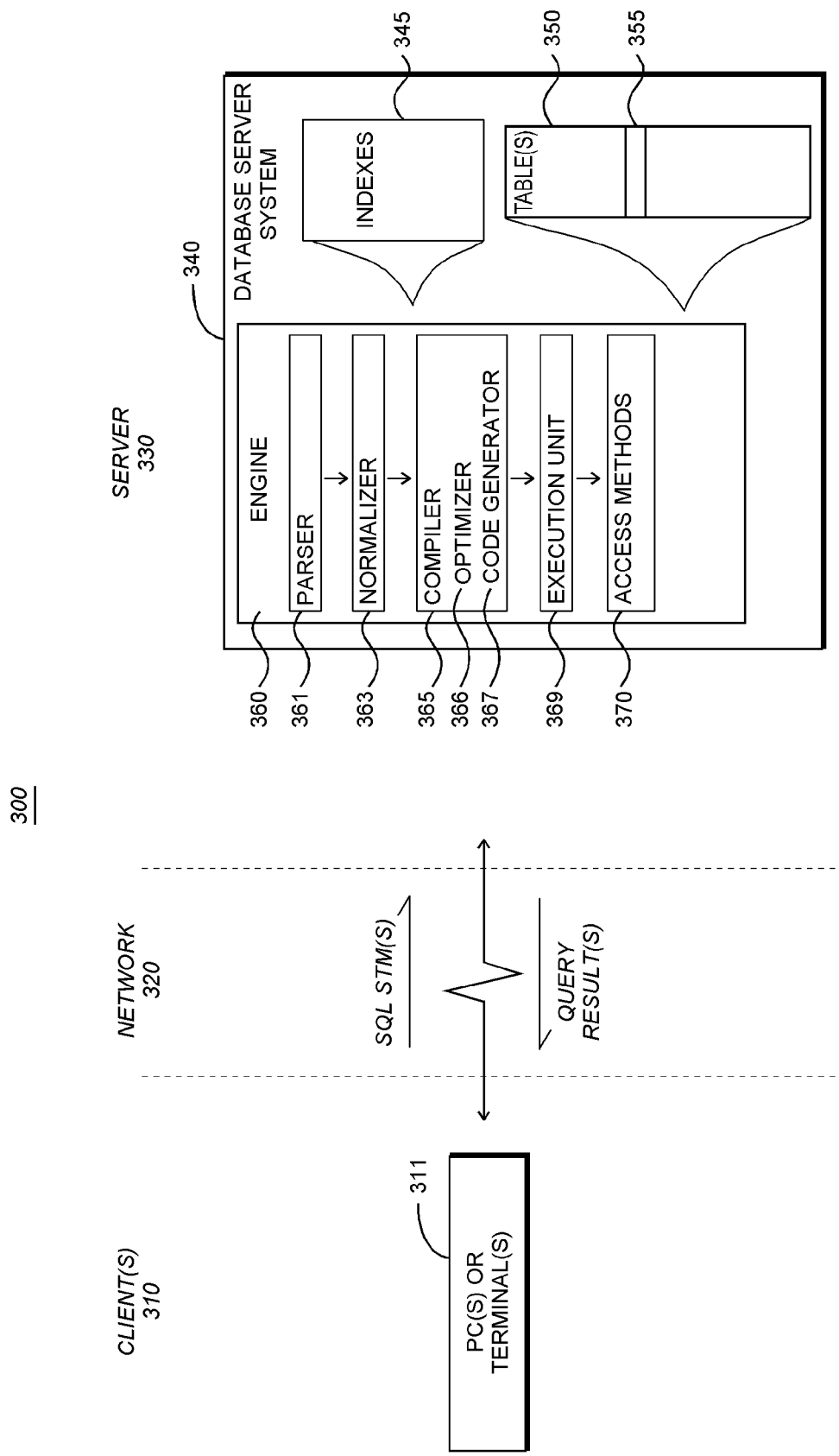
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, WA), UNIX (Novell), or Linux (Red Hat). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5 Product Documentation", available from Sybase, Inc. of Dublin, Calif. This product documentation is available via the Internet (e.g., currently at sybooks.sybase.com/asg1250e.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields". A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems". In addition to retrieving the data from database server table(s) 350, the clients 310 also include the ability to insert new rows of data records into the table. In addition, the clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer is responsible for optimizing the query tree. The optimizer 366 performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and selects the best execution plan, which in turn results in particular access methods being invoked during query execution.

For enhancing the storage, retrieval, and processing of data records, the server 330 maintains one or more database indexes 345 on the database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. An index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Performing Relational Operations Over Data From Soap Operations

The present invention comprises a system providing methods for executing relational operations over data retrieved from SOAP operations as well as relational data. The solution enables data retrieved from SOAP operations to be automatically and transparently mapped into a relational database system, thereby allowing relational operations to be performed over the data. This provides existing relational database users a significant advantage by reducing the costs and complexities involved in the integration of new applications. Additionally, these users may continue to use existing tools, thereby protecting their investment in these tools and avoiding the need for training on new tools.

In addition to these cost savings, the system and methodology of the present invention may also facilitate the integration of disparate software systems. The present invention may, for instance, enable new software systems (e.g., a new application from an application vendor) to be more easily integrated into a user's existing system environment. For example, supply chain integration is an application in which this capability could be particularly useful.

The system and methodology of the present invention provides access to data retrieved from SOAP operations without requiring a programmer to develop a custom solution. The present invention also supports using relational operators (including JOIN and UNION) for data retrieved from a web service using SOAP as well as the ability to create views based on a table that emulates the web service. The solution does not require modifications to the web service or a user's existing database repository. The system also enables the database to be optimized based on network performance of the SOAP (web) service.

The methodology of the present invention provides for representing methods of a web service as a table (proxy table) in the database system. When an operation is performed on a proxy table representing a method of the remote service, the system automatically performs the appropriate steps to interact with the web service and retrieve data from the web service. The solution enables data to be retrieved from the web service and relational operations performed on such data. The relational operations may be performed on data retrieved from the web service as well as data stored in the database system.

The system and methodology of the present invention provides a user with the ability to access web methods from a SQL client. A user may, for instance, utilize this capability to integrate data from an enterprise resource planning (ERP) system and a database system by performing a JOIN operation on data that is stored in both systems. Leveraging this data access transparency, the user may utilize the connectivity provided by SOAP while still enjoying the advantages of a relational database system, which include data modeling, replication, transaction caching, and data persistence. The components and operations of the system of the present invention will now be described.

System Components

Figure 4:
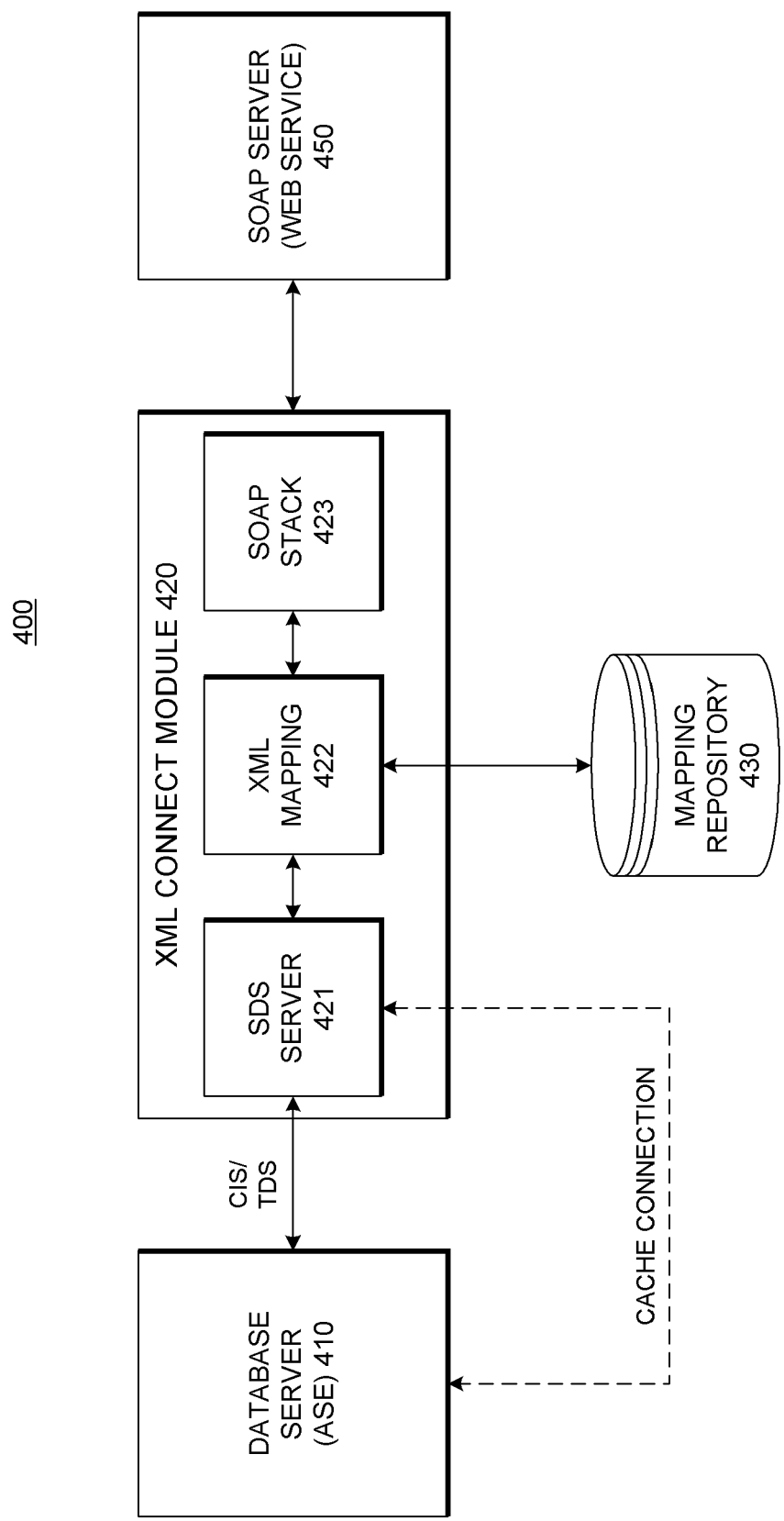
FIG. 4 is a high-level block diagram illustrating an environment in which the present invention is preferably embodied.

FIG. 4 is a high-level block diagram illustrating an environment 400 in which the present invention is preferably embodied. As shown, the environment 400 includes a database server 410, an XML Connect module 420, a mapping repository 430, and a SOAP server (web service) 450. As shown in the diagram, the components of the currently preferred embodiment of the XML Connect module 420 include a SDS (Specialty Data Store) server 421, an XML mapping component 422, and a SOAP stack 423. The setup and operation of each of the components will next be described.

To access a web service using the system of the present invention, the system must first be setup and initialized. In the currently preferred embodiment, this setup and initialization process includes establishing a connection between the database server 410 and the remote web service 450 through the XML connect module 420. The remote connection through the XML Connect process (or module) 420 is made using a published interface to a database server system 410. In the database server system of the currently preferred embodiment, remote servers can be configured by means of an "sp_addserver" stored procedure. This stored procedure allows a user to specify the server class to be associated with a particular server. The server class is used to determine which access methods are to be used when interacting with the remote server. In this case, the remote server is defined as an "SDS" or "Specialty Data Store" type (or class) server. "SDS" refers to a remote server that conforms to a particular interface specification providing database access to external data. In the currently preferred embodiment, the syntax for the stored procedure is: "sp_addserver server_name, server_class, netname". The "server_name" is a name used to identify the server which must be unique. The "server_class" is one of the supported server classes, such as the SDS class defined above. Note that if the server class is set to "local", then the "netname" is ignored. The "netname" is the server name contained within the interface file or directory service. The "netname" may be the same as "server_name", or it may differ.

Once the association between the database server and the remote server (web service) has been configured, login information needs to be considered. By default, the database system of the currently preferred embodiment uses the name and password of its clients whenever it needs to connect to a remote server on behalf of those clients. In the presently preferred embodiment, this name and password may be obtained from the TDS (Tabular Data Stream) login packet used by the client to connect to the database server. (The Tabular Data Stream protocol is a communication protocol used in the presently preferred database system for communication between client and server components.) However, the default name and password can be overridden by the use of the stored procedure "sp_addexternlogin". This stored procedure allows a system administrator to define the name and password to be used when connecting to a remote server on behalf of a particular user (client).

The Tabular Data Stream (TDS) protocol is an application-level protocol used to send requests and responses between clients and servers. The TDS protocol is mostly a token-based protocol where the contents of a Protocol Data Unit (PDU) are tokenized. The token and its data stream describe a particular command or part of a result set returned to a client. For example, there is a token called "TDS_LANGUAGE" which is used by a client to send language, typically SQL, commands to a server. There is also a token called "TDS_ROW-FMT" which describes the column name, status, and data type which is used by a server to return column format information to a client. The TDS protocol is half-duplex. A client writes a complete request and then reads a complete response from the server. Requests and responses cannot be intermixed and multiple requests cannot be outstanding.

A TDS request or response may span multiple PDUs. The size of the PDU sent over the transport connection is negotiated at dialog establishment time. Each PDU contains a header, which is usually followed by data. A PDU header contains information about the size and contents of the PDU as well as an indication if it is the last PDU in a request or response.

As an illustration of this protocol consider, for example, the SQL statement: "SELECT name FROM sysobjects WHERE id<3". The following will illustrate a high-level description of the TDS tokens exchanged by a client and a server to establish a dialog and then execute a simple SQL query. The query causes two table rows to be returned to the client. The client first requests a transport connection to the server and then sends a login record to establish a dialog. The login record contains capability and authentication information.

| | | |
|---|---|---|
| 1: | Client | Server |
| 2: | login packet {character pullout} | |
| 3: | | {character pullout} TDS_LOGINACK |
| 4: | | {character pullout} TDS_DONE |

Now that a dialog has been established between the client and the server, the client sends the SQL query to the server and then waits for the server to respond.

| | | |
|---|---|---|
| 1: | Client | Server |
| 2: | LANGUAGE: "select name..."{character pullout} | |

The server executes the query and returns the results to the client. First, the data columns are described by the server, followed by the actual row data. A completion token follows the row data indicating that all row data associated with the query has been returned to the client.

```
1:    Client          Server
2:            {character pullout} TDS_ROWFMT row description
3:            {character pullout} TDS_ROW row data
4:            {character pullout} TDS_ROW row data
5:            {character pullout} TDS_DONE
```

Although the above-described communication protocol is employed in the preferred embodiment, the present invention may be implemented using any comparable data streaming protocol.

After the database (ASE) 410 has been configured to know about the XML Connect module 420, the next step is to create the connection between the web service 450 and the database 410. For this purpose, a "sp_webservices" stored procedure is provided in ASE. The end user can use this stored procedure by inputting the name of a WSDL file (i.e., the WSDL file of the web service) to the "sp_webservices" stored procedure using an "add" option. This stored procedure, in turn, invokes a "gen_sproc_from_wsdl" stored procedure in the XML Connect module 420 that retrieves the specified WSDL file, parses the WSDL file, and creates the appropriate "create existing table" commands to create the proxy tables representing the remote service as hereinafter described. The SQL commands are executed in ASE by the "sp_webservices" stored procedure.

The XML Connect module 420 of the present invention provides connectivity between the database server 410 (e.g., Sybase Adaptive Server Enterprise) and a SOAP server (web service) 450. In addition, the XML Connect module 420 provides the ability to join data in relational tables with data retrieved from the web service 450 using SOAP.

After the database server 410 and the XML Connect module 420 are set up as described above, methods of the SOAP service (web service) 450 are mapped to proxy tables of the database server 410 by executing a stored procedure in the XML Connect module 420 in order to initialize internal structures in the XML Connect module 420 as well as in the database server 410 that are used to invoke the web service 450. Objects and methods of the remote server (i.e., the web service 450) cannot be accessed by the database system 410 as tables until a mapping has been established. This mapping results in the creation of one or more proxy table(s) within the database server system catalogs. This proxy table(s) appears to the user as a normal table, but serves as pointers to objects that are physically stored elsewhere.

A proxy table can be created as a new or existing object. If the table does not currently exist, a "create table" syntax may be used to create a new proxy table. If the proxy table already exists, then a "create existing table" or "create proxy_table" syntax can be used. If the object type is "RPC" (remote procedure call), then only the "create existing table" syntax is allowed. When a proxy table is created for an existing object, and the object type is either "table" or "view", the existence of the remote object (e.g., remote object of web service 450) is checked (e.g., by means of the catalog RPC "sp_tables"). If the object exists, then its column and index attributes are obtained (e.g., via the RPC's "sp_columns" and "sp_statistics", respectively). Column attributes are compared with those defined for the object in the "create existing table" command. Column name, type, length, and null property are checked. Index attributes are added to the database system's "sysindexes" system table. If the object type is "RPC", then the processing of the "create existing table" command results in the catalog RPC "sp_stored_procedures" to be sent to the remote server. The purpose of this step is to verify the existence of the remote procedure. Once the object has been created, either as a new or existing object, the remote object can be queried by referencing its local name. The XML Connect module 420 automatically generates all of the needed create table statements given a WSDL (Web Services Description Language) file that represents the web service 450.

Once this process is complete, any operation on this proxy table will be mapped to the appropriate web method on the SOAP server (web service) 450. After the system has been setup and initialized, a user may perform relational operations against this proxy table. The proxy table then emulates the SOAP service for the user as hereinafter described.

The XML Connect module 420 of the presently preferred embodiment supports both "RPC/encoded" and "document/literal" formats (or styles). The terms "RPC" and "document" refer to two types of encodings supported by SOAP which define what the payload should contain. If the SOAP message uses the "RPC" style, the message includes one or more XML element(s) representing each parameter for the web method being invoked. The "document" style indicates that the caller and the callee have complete control over the payload. The terms "encoded" and "literal" indicate how the data is to be serialized and deserialized. For "encoded", the serialization/deserialization procedure follows Section 5 of the SOAP specification. For "literal", the serialization/deserialization process involves following an XML schema that is specified in the WSDL file for the web service. For a web method of the "RPC/encoded" style (format), a proxy table is created with a column that represents each input and output argument in the web method. In the case of the "document/literal" style (format), the proxy table contains two columns referred to as "_inxml" and "outxml".

The operations of the system of the present invention in handling a sample relational operation which includes access to SOAP data are also illustrated at FIG. 4. In this example, assume that a user (not shown at FIG. 4) executes a SQL SELECT statement against a proxy table of the database server (ASE) 410 which has been set up to emulate a remote service as described above. Internally, the system of the present invention performs several operations in order to execute this SQL SELECT statement and return a result to the user. First, the SELECT statement is forwarded to the XML Connect module 420 using an interface referred to as the "CIS (Component Integration Services)/TDS (Tabular Data Stream) interface". For further description of Component Integration Services, see e.g., "OmniConnect Component Integration Services User's Guide for Sybase Adaptive Server Enterprise and Omni-Connect", Chapter 2, pp. 7-49, October 1999, available from Sybase, Inc., the disclosure of which is hereby incorporated by reference. A copy of this document is available via the Internet (e.g., currently at download.sybase.com/pdfdocs/asg 1200e/omni_ug.pdf).

Next, the XML Connect module 420 creates a mapping from the CIS/TDS layer to the SOAP stack using the mapping repository 430. If the mapping repository does not exist (i.e., has not yet been created), a default mapping is used. The mapping indicates those relational fields which correspond (i.e., map) to XML fields of the target SOAP server (web service) 450. Once the mapping has been completed, the SOAP message is sent to the web service 450. The XML Connect module 420 also obtains any results of the invocation of the web service 450.

After the results are obtained from the web service 450 by the XML Connect module 420, a reverse mapping is performed to map the data from XML to relational fields. Relational data may then be returned to the database server (ASE) 410 via a CIS/TDS interface. The database server completes the processing of the SELECT statement by returning relational data (e.g., a SQL result set responsive to the SELECT statement) to the user. The components and operations of the XML Connect module 420 will now be described in greater detail.

A first component of the XML Connect module 420 is the SDS server 421. In the currently preferred embodiment, the server connection to the XML Connect module is structured using the above-described Specialty Data Store (SDS) interface which facilitates database access to external data. Creating the interface between the XML Connect module 420 and the database server 410 in this manner allows the SDS server component 421 to intercept statements directed at one or more proxy table(s) of the database server 410. For each method of a web service, a proxy table is created. The SDS server acts as an RPC handler for these web methods. The CIS service of the database server 410 is notified of this fact when a "create existing table" statement is executed. In addition, the SDS server 421 is able to respond to any standard TDS client (e.g., isql which is an interactive SQL client tool that may be used in conjunction with Sybase® Adaptive Server® Enterprise (ASE)).

The database server of the currently preferred embodiment, Sybase® Adaptive Server® Enterprise, allows data from Specialty Data Stores (e.g., SDS server 421) to be joined with data from a local server (e.g., the database server 410) as well as from other remote servers or Specialty Data Stores (not shown at FIG. 4). When a client sends a SQL statement to the database server 410, the database server parses the SQL statement and sends each SDS server the appropriate portion of the original statement. The database server creates a result set based on the results from all servers (including SDS servers) involved in the query. The SDS server 421, on the other hand, is only concerned about access to the data it manages.

The connection to the database server 410 to persist table data exists in order to hold data that is stored in the proxy table. That is, when a user of the database server 410 does an insert to the proxy table that represents a web service, the insert actually adds a row to a "shadow" table that is created in the database server. Only when the user requests a column that is an output parameter of the web method is the method of the remote web service 450 actually invoked using SOAP. For example, an "insert into table" command inserts input parameters for a web method into a proxy table. A command such as "SELECT * from table WHERE input_args=X" causes the web method to be invoked.

The XML mapping module 422 is a layer that provides a mapping from relational data to XML. The mapping module makes use of a mapping repository 430 to store the conversions that can be used for mapping from relational data to XML. The mapping repository 430 provides for storing a mapping between the XML elements and particular tables and columns of the database server. As XML elements are encountered during the processing of an XML document and mapped to the database server, the mapping is retained and stored in the mapping repository 430. For example, the table and column into which particular XML data was placed may be retained in the mapping repository 430. One could use a number of different programs for implementation of the mapping repository. For example, the mapping repository could be provided by Sybase PowerDesigner available from Sybase of Dublin Calif., or by jAllora available from HIT Software of San Jose, Calif.

The SOAP stack module 423 serves as the interface to the web service (e.g., SOAP server 450) and is used for sending and receiving method calls using SOAP. For example, the SOAP stack module is used for receiving XML-based requests, invoking the web services (e.g., on the SOAP server), and returning results. In the currently preferred embodiment, the SOAP stack module includes a WSDL parser that supports XML schema data types as well as providing for the automatic generation of mapping files from SOAP to Java for complex data types. A SOAP stack component suitable for use in conjunction with the present invention is available from a number of vendors, including Sun Microsystems of Santa Clara, Calif. and The Apache Software Foundation of Forest Hill, Md.

In one embodiment, the system operates in conjunction with an Apache AXIS SOAP software library available from The Apache Software Foundation. The Apache AXIS software conforms to the JAX-RPC specification (the Java API for XML-based RPC). For further description of the JAX-RPC specification, see e.g., "Java API for XML-based RPC (JAX-RPC) Specification 1.1", available from Sun Microsystems, Inc., the disclosure of which is hereby incorporated by reference. A copy of this JAX-RPC specification is available via the Internet (e.g., currently at java.sun.com/xml/jaxrpc/). To access the SOAP stack for each web method, a "Call" object is created for each web method. The "Call" object is stored (e.g., in a "sysattributes" table) for each web method. To execute the web method, the method invoked on the "Call" object is executed. The "Call" object is usually created on the first invocation of the web method through the proxy table. In this case the "Call" data in the "sysattributes" table for this web method will be empty when the method is initially invoked. The other option is that "sp_webservices add" has been invoked and in this case, the "Call" data will be properly populated. The process for invoking a remote service will now be described in greater detail.

DETAILED OPERATION

Methods of Operation

Figure 5A:
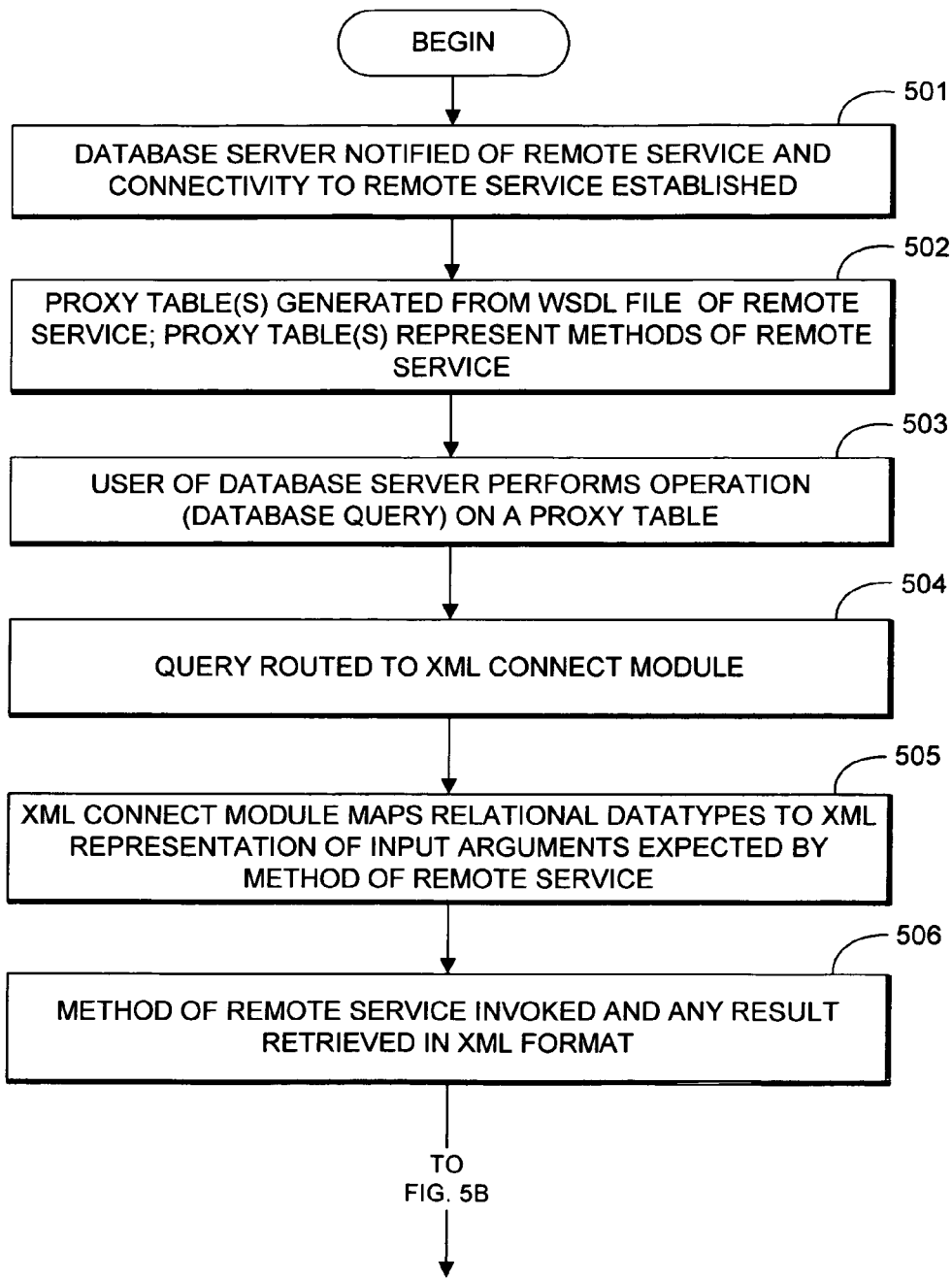
FIGS. 5A-B comprise a single flowchart illustrating the operations that occur within the system of the present invention when a web service is remotely invoked in response to a command issued by a database client.
Figure 5B:
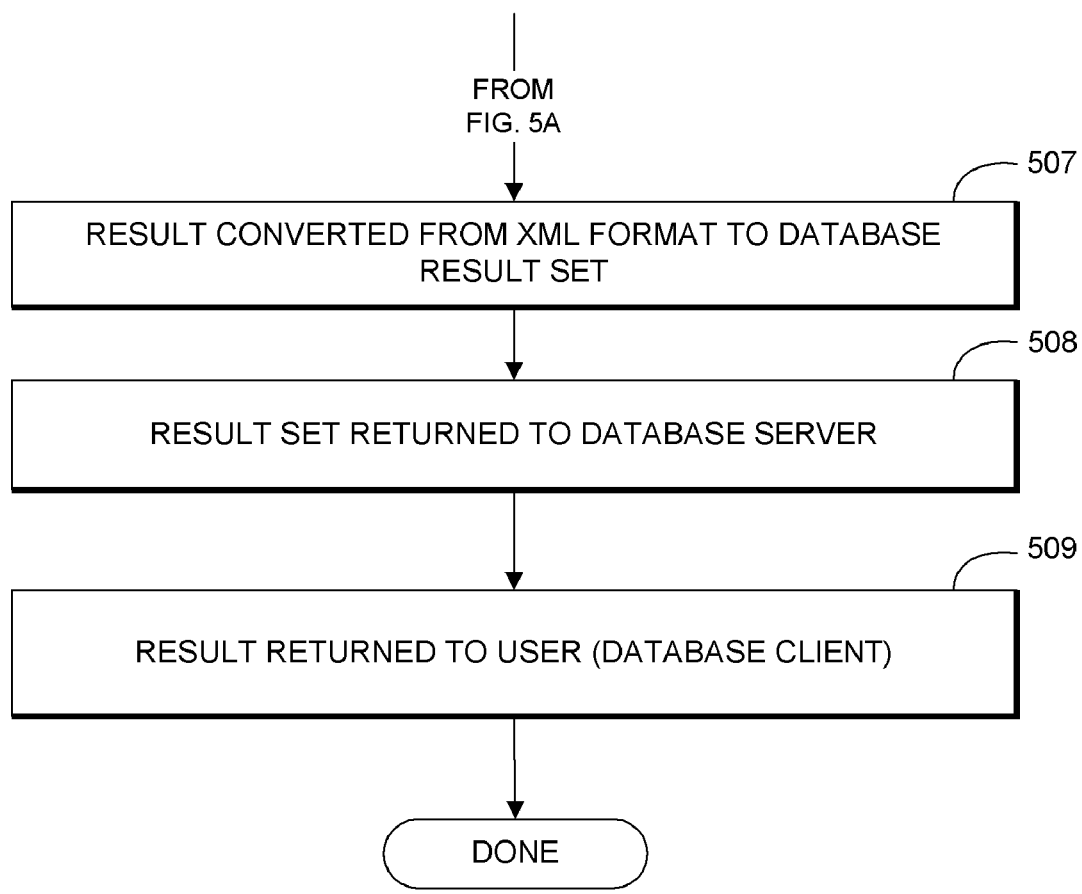

FIGS. 5A-B comprise a single flowchart illustrating the operations that occur within the system of the present invention when a web service is remotely invoked in response to a command issued by a database client. For purposes of this discussion, assume that the system environment is set up as illustrated at FIG. 4 with a database server (Sybase Adaptive Server Enterprise or "ASE") invoking a web service through an XML Connect module of the present invention. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The sequence of operations begins with the initialization of the system. There are two general steps undertaken to initialize the system. First, at step 501 the database server system (ASE) is notified of the remote service, and connectivity is established between the database server (ASE) and the remote service. The first step of notifying the database server (ASE) that the remote service is available typically needs to be done only once. The database server can be notified of the web service using an "sp_addserver" command as described above. This command informs the ASE database server that there is an SDS server (e.g., named "webservices") representing the XML Connect module. The hostname and port number to use for this SDS server are also provided in an interfaces file (e.g., under the entry of "webservices"). The "sp_addserver" command is executed before any other web services related commands.

After a communication channel between the ASE database server and the XML Connect module has been established, at step 502 proxy tables are set up based on a WSDL (Web Service Description Language) file to represent methods of the remote service. In the presently preferred embodiment, this second initialization step is done by generating and executing "create existing table" statements for each of the web methods of the remote service (i.e., based on each of the web methods in the WSDL file). In response, proxy tables are automatically generated in the ASE database server so that methods of the remote service can be invoked when the proxy table is called. The proxy tables represent methods of the remote service. In addition, meta data is stored enabling the remote service to be identified and called in response to an operation (e.g., a SQL SELECT operation) on the proxy tables.

After initialization, a user may log into the database server (ASE). The client may, for example, log into the database server over a network from a separate client device (e.g., personal computer or workstation) using ODBC or JDBC. At step 503, the user at a client device connected to the database server may perform an operation on a proxy table that was set up to represent a method of a remote service. For example, a user may wish to obtain a temperature from a weather service for a given zip code by performing a SQL SELECT operation having a WHERE clause (e.g., WHERE zip_code=94556). The weather service is a remote service that is represented by a local proxy table of the database.

When the query is received at the database server, the database server knows that the table is a proxy table representing a remote service. At step 504 the query is routed via a CIS interface to the XML Connect module. The CIS (Component Integration Services) interface is a well defined interface for dealing with relational data types that is included as part of the database management system (ASE) of the currently preferred embodiment. One purpose of the CIS interface is to allow an external process (e.g., a remote database) to answer SQL queries on a table in a local database server. The CIS interface enables tables of a remote database to appear as local tables in the local database server.

The SDS Server component of the XML Connect module receives the query including the SQL SELECT statement via the CIS interface. Using the meta data about the remote service stored during initialization, the XML Connect module understands that the query is to be routed to a remote web service. At step 505, the XML Connect module examines the query, including the WHERE clause of the query and any input arguments applied to the SELECT statement, and converts the query into XML format. More particularly, a mapping module is used to map relational data types to the appropriate XML representation of the arguments expected by the web method.

After converting the query into XML format, at step 506 the XML Connect Module invokes the remote web service (e.g., using an Apache AXIS SOAP stack). The applicable method of the web service is called using the SOAP stack. Any result from the invocation of the web method is retrieved in XML format. Next, at step 507 the result is converted from XML format back into a database result set (e.g., relational data types) by the XML connect module based on the XML mapping. This is basically the reverse of the mapping operation that occurs when the request (e.g., the query) is routed to the web service. However, it is slightly more complex as it involves the translation of (potentially) arbitrary XML returned in response to invocation of the web method. Given that XML may be translated into SQL result sets in a variety of ways, a mapping repository is provided for mapping XML to SQL. During this conversion process the mapping repository may be consulted for determining how particular XML is to be translated into SQL syntax.

After conversion, at step 508 the SQL result set is returned back to the database server (ASE) via the CIS interface. At step 509, the result is then returned by the database system to the end user client (e.g., an isql client). The end user may then view the result (e.g., the current temperature at a particular location identified by zip code) at the client device.

The above discussion describes a simple example in which all of the input parameters to the web method were provided in the WHERE clause of the query. A more complex example involves a SQL SELECT * statement on a given proxy table. In the case of a SELECT * statement, there are typically no such input parameters, so the database client (e.g., an isql client) performs an insert into the proxy table which represents the remote service. The insert operation flows through the system in a somewhat different manner than described above as will now be briefly described.

The SDS Server receives the insert statement to the proxy table via CIS in the same fashion described above. However, rather than invoking the remote web service, a new row is added (inserted) into a "shadow" table that is created in the database system. This "shadow" table is essentially a cache for data from the web service. In the currently preferred embodiment this shadow table is not visible to the database client and is managed by the XML Connect module.

As previously described, the connection to the database server to persist table data exists to hold data that is stored in the proxy table. That is, when a database client does an insert to the proxy table that represents a web service, the insert actually adds a row to the "shadow" table that is created in the database. Only when a database client requests a column that is an output parameter of the web method is the web method actually invoked using SOAP. In this circumstance the XML Connect module notices that some of the columns are to be supplied by the remote web service and the XML Connect module uses the data in the shadow table to provide the input parameters for the applicable method of the web service. The advantages of proceeding in this fashion include the fact that if all the parameters exist in the shadow table, the web service does not need to be invoked (thereby improving overall system performance). Also, this approach creates a model for the web service in the relational data model, enabling existing database tools to be used. This decreases the learning curve needed for integration of the web service into the overall system.

Creation of Proxy Tables to Represent Methods of Web Service

The operations of the system of the currently preferred embodiment in creating proxy tables to represent methods of a remote web service will now be described in greater detail. As described above, after communication is established between the database server (e.g., ASE) and the remote web service, the next step in initializing the system is to create proxy tables to represent methods of the web service based on the WSDL file specified for the remote service. An "XMLRpcHandler.java" class handles RPC events received by the XML Connect module from a database server (ASE/CIS). Although the currently preferred embodiment of the present invention uses the Java programming language (e.g., version 1.3.1), the methodology of the present invention may also be implemented using a different programming language, as desired. Accordingly, the following examples using the Java programming language are for purposes of illustration and not limitation.

When a handle-mapping RPC event is received specifying a WSDL file, the following "handleMappings" method of the "XMLRpcHandler.java" class initiates the creation of the proxy tables and the associated meta data that enable RPC calls to be resolved by the system:

```
1:   protected void handleMappings (XMLReceiver receiver,
2:       SrvSession s,
3:       SrvDbrpcToken rpc,
4:       Object[] o) throws IOException, SQLException
5:   {
6:       Globals.xmlLogger.trace ("XMLRpcHandler.handleMappings");
7:       int returnStatus = 1;
8:       boolean done = true;
```

```
 9:      Object[] desc = null;
10:      String sqlCommands = null;
11:
12:      if (rpc.hasParams () == false)
13:      {
14:          returnStatus = 1;
15:      }
16:      else
17:      {
18:         try
19:         {
20:            Connection conn = null;
21:
22:
23:            SrvLoginToken sLoginToken = s.getLogin();
24:            String userName = sLoginToken.getUser();
25:            String password = sLoginToken.getPassword();
26:            String service = sLoginToken.getHost();
27:
28:            String wsdlFile = (String) o[0];
29:
30:
```

```
31:        String aseServerName = Globals.si.getHostName
           (service);
32:        Globals.xmlLogger.debug ("aseServerName is: " +
           aseServerName);
33:
34:        String asePortStr = Globals.si.getPortNumber
           (service);
35:        Globals.xmlLogger.debug ("asePortStr is: " +
           asePortStr);
36:
37:        if (aseServerName != null && asePortStr != null)
38:        {
39:            int asePortNumber = Integer.parseInt (asePortStr);
40:
41:            conn = aseutil.login (aseServerName, asePortNumber, null,
42:                userName, password);
```

```
43:
44:             if (conn != null)
45:             {
46:                 if (Globals.pageSize ==
PAGESIZE_UNINITIALIZED)
47:                 {
48:                     ResultSet rs = aseutil.executeStatement (conn,
49:                         "select @@pagesize");
50:
51:                     // Move to the first row.
52:                     rs.next ();
53:                     Globals.pageSize = rs.getInt (1);

54:                 }
55:
56:                 // Setup to parse the wsdl file.
57:                 Wsdl2ase myWsdl = new Wsdl2ase ();
58:
59:                 myWsdl.addFactory ();
60:                 String args[] = new String[3];
61:
```

```
62:             // Directory for generating the
63:             // stub java files and compiling them
64:
65:             String rootDir;
66:
67:             rootDir = System.getProperty
(TEMPDIR_PROPERTY);
68:
69:             if (rootDir == null)
70:             {
71:                 rootDir = System.getProperty
("java.io.tmpdir")
72:                     + "xmlconnect";
73:             }
74:             boolean dirCreated;
75:             File rootDirFile = new File (rootDir);
76:
77:             if (rootDirFile.isDirectory () == false)
78:             {
79:                 dirCreated = rootDirFile.mkdirs ();
80:             }
81:
82:             String jarDirectory = rootDir +
```

```
            File.separator + "jars";
83:         File jarDirFile = new File (jarDirectory);
84:
85:         if (jarDirFile.isDirectory () == false)
86:         {
87:             dirCreated = jarDirFile.mkdirs ();
88:         }
89:
90:         String wsdlRootDir = rootDir + File.separator
91:             + System.currentTimeMillis ();
92:
93:         args[0] = "-o" + wsdlRootDir;
94:         args[1] = "-O-1";
95:         args[2] = wsdlFile;
96:
97:         // Launch the WSDL parsing. Note the WSDL
98:         // can be located at a URL, so this parsing
99:         // is done under a timeout condition that
100:        // throws a general Exception. The ti
``` meout condition is implemented

101:            // by spawning a thread and killing it if a the timer fires. Note 102:            // that Java timers are notoriously slow and nowhere near accurate.

103:            // The best that can be said is that the timer will not fire before 104:            // the specified time....

105:

106:            myWsdl.launch (args);

107:

108:            // Now we have a mapping between the WSDL

109:            // file and an ase2wsdl object.

110:

111:            ase2wsdl mapping = (ase2wsdl) Globals.webMethods.get (wsdlFile);

112:

113:            // Generate the sql commands neede d to

114:            // create the proxy table.

115:            sqlCommands = mapping.genCISSql (s.getLogin ().getServiceName ());

116:            Globals.xmlLogger.info ("sqlcommands: <" + sqlCommands + ">");

117:

118:            // Compile the stub files so that we can

119:            // use them when we invoke the web method.

120:

121:            Utility.compileDir (wsdlRootDir);

122:

123:            // Load the compiled class files and source files into a jar

124:            // and modify the classpath as needed.

125:

126:            String jarFileName = jarDirectory + File.separator

127:            + mapping.getJarFileName ();

```
128:
129:            Utility.createJar (jarFileName,
wsdlRootDir, true);
130:            Utility.addJarToClasspath (jarFileNam
e);
131:
132:            mapping.setFullJarName (jarFileName
);
133:            returnStatus = 0;
134:        }
135:        else
136:        {
137:            Globals.xmlLogger.error ("Connection to
ASE not created successfully");
138:        }
139:    }
140:    else
141:    {
142:        Globals.xmlLogger.error ("Invalid asePor
t or
aseServer");
143:    }
```

```
144:        }
145:        catch (ClassNotFoundException err)
146:        {
147:            Globals.xmlLogger.fatal (err.getMessage ())
;
148:            returnStatus = 1;
149:        }
150:        catch (SQLException err)
151:        {
152:            Globals.xmlLogger.fatal (err.getMessage ())
;
153:            returnStatus = 1;
154:        }
155:        catch (Exception err)
156:        {
157:            Globals.xmlLogger.fatal (err.getMessage ())
;
158:            returnStatus = 1;
159:        }
160:    }
161:
162:    if (returnStatus == 0)
163:    {
```

```
164:        SrvDataFormat[] datadesc = new SrvDataFormat[1];
165:
166:        datadesc[0] = new SrvDataFormat ("outparam",
            TdsConst.VARCHAR,
167:        TdsConst.ROW_UPDATABLE | TdsConst.ROW_NULLALLOWED,
            255, null);
168:
169:        int numRows = 0;
170:
171:        StringTokenizer st = new StringTokenizer (sqlCommands,
            "\n", false);
172:        String token = null;
173:
174:        while (st.hasMoreTokens ())
175:        {
176:            token = st.nextToken ();
177:            numRows++;
178:        }
179:
```

```
180:        Object[][] localData = new Object[numRows][
1];
181:
182:        st = null;
183:        st = new StringTokenizer (sqlCommands, "\n
", false);
184:        int index = 0;
185:
186:        while (st.hasMoreTokens ())
187:        {
188:            token = st.nextToken();
189:            localData[index][0] = new String (token);

190:            index++;
191:        }
192:
193:        int count = receiver.sendResults (s, datadesc, localData);
194:
195:        receiver.SendDone (s, count, false, true, true)
;
196:    }
197:    else
```

```
198:      {
199:          // Something failed, we send nothing back, but we
200:          // have to tell CIS that we're done.
201:          // perhaps, we should send an EED here.
202:          receiver.sendRPCParams (s, 0, null, null, true);
203:      }
204:      Globals.xmlLogger.trace ("XMLRpcHandler.handleMappings");
205: }
```

Initially, the "if" condition at line 12 verifies the receipt of input parameters. If input parameters have been received, then the "else" clause commencing at line 16 collects certain information, including the user name, the user password, the name of the database server ("aseServerName"), and the port number for communication with the remote service.

Next a check is made to determine if the database server name and port number are valid. If the server name and port are valid (i.e., not null) as provided at line 37, then an attempt is made to log in to the ASE server as provided at line 41. If the login is successful, the page size for the database server is determined as provided above at lines 46-54. The page size of the database server is needed to determine how to create appropriate columns.

Next, as illustrated commencing at line 57 above, a call is made to a class called "Wsdl2ase" which is an encapsulation of the Apache AXIS SOAP software. The purpose of this class is to provide an easy way to invoke the Apache AXIS SOAP stack. In this case the call will pass in the WSDL file and the Apache AXIS software will parse the WSDL file and generate the Java code that enables the web service represented by the WSDL file to be called. After the Java code has been generated, the Java code is then compiled and loaded into the system. More particularly, at line 59, an "addFactory" method of the "Wdsl2ase" class is called to use this "Wdsl2ase" class. Then, using a "TEMPDIR_PROPERTY", a temporary location is created for placing the Java files that are generated. Also, a location to insert the generated JAR files (containing the Java code) is created as provided at lines 82-88. As shown at lines 93-95, "args [0]", "args [1]", and "args [2]" are then populated to set up where the Apache AXIS module should place the output of its processing of the WSDL file.

After these initialization steps have been completed, a call is made to "myWsdl.launch" as shown at line 106. This causes the Apache AXIS software to be launched in a different thread to create the Java code that will be used to invoke the web methods. The Apache AXIS software has a "launch" method that is called to launch the parsing of the WSDL file. The system creates meta data for the WSDL file as well as a database to WSDL mapping file (i.e., an "ase2wsdl" mapping object) which provides an easy way to represent the data. The mapping object that is created can be used to generate the SQL commands needed to create the proxy table.

As shown at line 115, a call is made to a "genCISSql" method of the "ase2wsdl" class. The "ase2wsdl" class includes a series of objects representing a WSDL file and provides the information used to invoke operations on the service represented by the WSDL file as follows:

```
 1: package com.sybase.ase.ws.server;
 2:
 3: /**
 4:  * FileName: ase2wsdl.java
 5:  * PackageName: com.sybase.ase.ws.server
 6:  *
 7:  * Description:
 8:  * This class represents a WSDL file and provides all the
 9:  * information needed to invoke operations in it from ASE.
10:  *
11:  */
12:
13: import java.util.Vector;
14: import java.util.Iterator;
15: import java.util.Hashtable;
16:
17: import org.apache.axis.wsdl.symbolTable.SymbolTable;
18: import org.apache.axis.wsdl.symbolTable.ServiceEntry;
19: import javax.wsdl.Service;
20:
21: import java.net.URL;
22: import java.io.File;
23: import java.net.URLClassLoader;
24: import java.net.MalformedURLException;
25:
26: import com.sybase.ase.ws.util.Globals;
27:
28: public class ase2wsdl
29: {
30:    String     _jarFileName;
31:    String     _fullJarFileName;
32:    ServiceEntry   _sEntry;
33:    Service    _service;
34:    SymbolTable   _symTable;
35:    Vector     _services;
36:    URLClassLoader _jarLoader;
37:
38:    public ase2wsdl (ServiceEntry sEntry, SymbolTable symTable)
39:    {
40:       _jarFileName = sEntry.getName ( ) + ".jar";
41:       _sEntry = sEntry;
42:       _symTable = symTable;
43:       _services = new Vector ( );
44:       ase2service aseService = new ase2service (this, _sEntry,
_symTable);
45:
46:       _services.add (aseService);
47:       String wsdlURI = symTable.getWSDLURI ( );
48:
49:       Globals.webMethods.put (wsdlURI, this);
50:    }
51:
52:    public void setFullJarName (String fullJarFileName)
53:    {
54:       _fullJarFileName = fullJarFileName;
55:    }
56:
57:    public URLClassLoader getJarLoader ( )
58:    {
59:       if (_jarLoader == null)
60:       {
61:          URL[] dummy = new URL[1];
62:
63:          try
64:          {
65:             dummy[0] = new File (_fullJarFileName).toURL ( );
66:             _jarLoader = new URLClassLoader (dummy);
67:             Globals.xmlLogger.info ("making jar loader success with:"
68:                + dummy[0]);
69:          }
70:          catch (MalformedURLException err)
71:          {
72:             Globals.xmlLogger.fatal ("Caught exception:" + err);
73:          }
74:       }
75:       return (_jarLoader);
76:    }
77:
78:    public String genCISSql (String service)
79:    {
80:       String cissql = "";
81:
82:       Iterator allServices = _services.iterator ( );
83:       ase2service aService = null;
84:
85:       while (allServices.hasNext ( ))
86:       {
87:          aService = (ase2service) allServices.next ( );
88:          cissql += aService.genCIS (service);
89:       }
90:       return (cissql);
91:    }
92:
```

```
 93:    public Hashtable getMappings ( )
 94:    {
 95:        Hashtable toReturn = new Hashtable ( );
 96:
 97:        Iterator allServices = __services.iterator ( );
 98:        ase2service aService = null;
 99:
100:        while (allServices.has Next ( ))
101:        {
102:            aService = (ase2service) allServices.next ( );
103:            Iterator allOperations = aService.getOperations ( ).iterator ( );
104:            ase2operation aOperation = null;
105:
106:            while (allOperations.hasNext ( ))
107:            {
108:                aOperation = (ase2operation) allOperations.next ( );
109:                toReturn.put (aOperation.getOperationName ( ),
110:                    aOperation.getAseRPCName ( ));
111:            }
112:        }
113:
114:        return (toReturn);
115:    }
116:
117:    public String getKey ( )
118:    {
119:        return (__sEntry.getName ( ));
120:    }
121:
122:    public String getJarFileName ( )
123:    {
124:        return (__jarFileName);
125:    }
126:
127:    public Vector getServices ( )
128:    {
129:        return (__services);
130:    }
131: }
```

The "ase2wsdl" class includes a series of objects for mapping the WSDL file to the database server system. These objects include an "ase2wsdl" object and an "ase2service" object. Each service represented within the WSDL file is mapped to the database server system (ASE) and each web operation has a mapping to an ASE table (i.e., a proxy table of the database server).

Essentially, the "genCISSql" method shown above at lines 78-91 will go through all of the services represented in the WSDL file and invoke a "genCIS" method of an "ase2service" class. The "ase2service" class represents the conversion of a service into database (ASE) format. Of particular interest, the below "genCIS" method of the "ase2service" class causes the SQL statements for creating the proxy table to be generated based on the WSDL file for the web service:

```
 1: package com.sybase.ase.ws.server;
 2:
 3: /**
 4:  * FileName: ase2service.java
 5:  * PackageName: com.sybase.ase.ws.server
 6:  *
 7:  * Description:
 8:  * This class represents the conversion of a WSDL service into
 9:  * ASE.
10:  *
11:  */
12:
13: //....
14:
15:    public String genCIS (String service)
16:    {
17:        StringBuffer cisCommand = new StringBuffer ( );
18:
19:        Iterator iOperations = __operations.iterator ( );
20:        ase2operation aOperation = null;
21:        StringBuffer tempCmd = null;
22:
23:        while (iOperations.hasNext ( ))
24:        {
25:            aOperation = (ase2operation) iOperations.next ( );
26:            if (aOperation != null)
27:            {
28:                tempCmd = new StringBuffer ("drop table ");
29:                tempCmd.append (aOperation.getAseRPCName ( ));
30:                tempCmd.append ("\n");
31:                tempCmd.append ("create existing table ");
32:                tempCmd.append (aOperation.getAseRPCName ( ));
33:                tempCmd.append (" (");
34:
35:                if (__bindingStyle.value == 0)
36:                {
37:                    boolean needComma = false;
38:
39:                    // Output parameters
40:                    Vector outParms = aOperation.getOutputParameters ( );
41:                    Iterator iParms = null;
42:                    ase2parameter aParm = null;
43:
44:                    aParm = aOperation.getReturnParameter ( );
45:                    if(aParm != null)
46:                    {
47:                        tempCmd.append (addColumn (aParm, false, false));
48:                        needComma = true;
49:                    }
50:
51:                    if (outParms != null)
52:                    {
53:                        iParms = outParms.iterator ( );
54:                        while (iParms.hasNext ( ))
55:                        {
56:                            aParm = (ase2parameter) iParms.next ( );
57:                            tempCmd.append (addColumn (aParm, needComma, false));
58:                            needComma = true;
59:                        }
60:                    }
61:
62:                    // Input parameters
63:                    Vector inParms = aOperation.getInputParameters ( );
64:
65:                    if (inParms != null)
66:                    {
67:                        iParms = inParms.iterator ( );
68:                        aParm = null;
69:                        while (iParms.hasNext ( ))
70:                        {
71:                            aParm = (ase2parameter) iParms.next ( );
72:                            tempCmd.append (addColumn (aParm, needComma, true));
73:                            needComma = true;
74:                        }
75:                    }
76:                }
77:                else if (__bindingStyle.value == 1)
```

```
78:     {
79:         tempCmd.append ("outxml varbinary(15000),
_inxml varchar("
80:            + Globals.pageSize + ") null");
81:
82:         // tempCmd.append("outxml varchar(" +
Globals.
pageSize + "), _inxml varchar(" + Globals.pageSize + ")
null");
83:         // tempCmd.append("outxml text,
_inxml varchar(" + Globals.pageSize + ") null");
84:     }
85:
86:     // String cisRemote = System.getProperty
(CIS_REMOTE);
87:     String cisRemote = service + ".XMLCONNECT";
88:
89:     tempCmd.append (" ) external procedure at
'" +
cisRemote + ".");
90:         tempCmd.append (_aseOwnerName);
91:         tempCmd.append (".");
92:         tempCmd.append (aOperation.getAseRPCName
());
93:         tempCmd.append ("'");
94:         tempCmd.append ("\n");
95:     }
96:     cisCommand.append (tempCmd.toString ( ));
97: }
98: return (cisCommand.toString ( ));
99: }
```

The above "genCIS" method evaluates objects provided by Apache AXIS about the WSDL file and then maps each item into an equivalent database (ASE) type. Using that information the SQL statements (e.g., "create existing table" statements) for creating the proxy table are generated. The above "genCIS" method consults an "ase2operation" class that provides information on specific web methods (such as what are the input parameters and output parameters of a particular web method). The "ase2operation" class is also consulted for determining an equivalent relational mapping for a given operation defined in the WSDL file.

A given web service will typically have a number of operations (i.e., methods) that may be invoked. For each web method an "ase2operation" object is created that encapsulates the mapping of the web method to the database (ASE). The "genCIS" method collects and organizes all of this information regarding methods of the web service enabling the remote service to be invoked. Meta data is also created and stored in the XML Connect module, so that it can be determined which particular method of the remote web service should be invoked when a particular proxy table is called. More particularly, the "while" loop commencing at line 23 above will step through each of these operations to create the appropriate SQL commands for invoking the operation (web method). As shown at lines 28-29, a first command is to drop any existing ASE tables with that name. This is achieved by a drop table command at line 28 ("tempCmd=new StringBuffer ("drop table")") and by appending the "AseRPCName" at line 29 ("tmp.Cmd.append (aOperation.getAseRPCName( )"). The "AseRPCName" is the mapping of the WSDL web method name to a valid name at the database server (for instance taking into account reserved words and so forth). The result is that any table with the same name as the web method is dropped.

Next, commencing at line 31 a "create existing table" command is created for adding columns for each of the web method's arguments. The create existing table command adds one column for each input and output argument of the web method. This is done by first stepping through all of the output arguments of the web method and retrieving their appropriate database equivalent as provided at lines 40-60. As part of this process an "add-Column" method is called and given a parameter to create the appropriate ASE syntax for each output argument. The input parameters of the method are similarly processed as shown commencing at line 63.

As previously described, web services have two general styles or formats. The first style, which is referred to as "RPC/encoded", provides for invoking the method with individual arguments. The second, which is referred to as "document/literal" provides for input and output XML arguments. In the case of a "document/literal" style web method, a proxy table with two columns is created. The first column is the "_inxml" column and the second is the "outxml" column.

The final portion of the GenCIS method at lines 87-97 creates the mapping for CIS to indicate that the XML Connect module should be invoked externally (e.g., when a SQL SELECT statement is called on the proxy table). As shown at lines 89-95, a command is created for externally invoking the XML Connect module with the appropriate operation name. As described above, the methodology of the present invention provides for creating tables to represent methods of the remote web service and creating the database statements to invoke these methods. The operations that occur when a given web method is invoked will now be described.

Remote Invocation of a Method of a Web Service

After the proxy tables have been created to represent methods of a web service and the related meta data assembled in the XML Connect module, methods of the web service may be invoked. The following discussion will describe the operations that occur in conjunction with an invocation of a sample web method. For example, a database client may issue a query including a SELECT statement on a proxy table of the database server. When a SELECT statement on the proxy table is received, the SELECT statement is intercepted and eventually turned into a call to invoke the web method. More particularly, in response to the SELECT statement on the proxy table, the following "invoke" method of an "ase2operation" class is initially called:

```
1:  public opReturn invoke (Object[] args) throws Exception
2:  {
3:      opReturn toReturn = null;
4:
5:      if (_serviceEntry._bindingStyle == Style.RPC)
6:      {
7:          toReturn = invokeRPC (args);
8:      }
9:      else if (_serviceEntry._bindingStyle == Style.DOCUMENT)
10:     {
11:         toReturn = invokeDocument (args);
12:     }
13:
14:     return (toReturn);
15: }
```

In the presently preferred embodiment there are two different execution paths for invoking the web method through the SOAP stack (e.g., Apache AXIS software) depending on the "style" (or "binding style") of the web method that is to be invoked. As shown above at lines 5-8, if the binding style is "RPC", then an "invokeRPC" method is called. However, if the binding style is "document" then an "invokeDocument" method is called as provided at lines 9-12. In general, both the "invokeRPC" and the "invokeDocument" methods take the data that was received with the SELECT statement at the database server and bind this information to a SOAP call for invoking the web service. Each of these methods will now be described.

The "invokeDocument" method of the "ase2operation" class is as follows:

```
1: private opReturn invokeDocument (Object[] args) throws
Exception
2:   {
3:       opReturn toReturn = null;
4:
5:       Service service = new Service ( );
6:       Call call = (Call) service.createCall ( );
7:
8:       call.setTargetEndpointAddress (new URL
(_serviceEntry._locationURI));
9:       call.setSOAPActionURI (_operationImpl.getSoapAction
URI ( ));
10:      call.setPortName (_serviceEntry._portTypeName);
11:
12:      WSParser parser = new WSParser ( );
13:      SOAPBodyElement[] sbElements = parser.getSoap
Body ((String)
args[0]);
14:
15:      Vector elems = null;
16:
17:      if (sbElements.length != 0)
18:      {
19:          elems = (Vector) call.invoke (sbElements);
20:          toReturn = new opReturn ( );
21:          toReturn.desc = new SrvDataFormat[1];
22:          toReturn.data = new Object[1][elems.size ( )];
23:
24:          StringBuffer allData = new StringBuffer ( );
25:          SOAPBodyElement tempBodyElement = null;
26:          StringBuffer rowData;
27:          int ii = 0;
28:
29:          if (elems != null)
30:          {
31:              Iterator elemsI = elems.iterator ( );
32:
33:              while (elemsI.hasNext ( ))
34:              {
35:                  tempBodyElement = (SOAPBodyElement)
elemsI.next ( );
36:                  // Note that we only support UTF-8 character
set. No conversions at all.
37:                  rowData = new StringBuffer ("<?xml
version=\"1.0\" encoding=\"UTF-8\"?>");
38:                  rowData.append (tempBodyElement.toString
( ));
39:                  toReturn.data[0][ii] = rowData.toString
( ).getBytes ( );
40:                  ii++;
41:                  rowData = null;
42:                  // all Data.append(tempBodyElement.toString
( ));
43:              }
44:
45:              toReturn.desc[0] = new SrvDataFormat ("out
xml",
46:                  TdsConst.LONGBINARY, TdsConst.ROW_UPDATABLE,
15000,
null);
47:
48:          }
49:      }
50:
51:      return (toReturn);
52:  }
```

Initially a "Call" object is created ("Call call=(call) service.createCall ( )") as provided above at line 6. The "Call" object is then populated with the endpoint address of the web service URI as provided at line 8. Next, the input parameters of the method of the web service being called are populated.

The input received from the database (e.g., from the WHERE clause of a SQL query) is parsed and put into SOAP format for calling the remote method. As shown at line 13, the call to "getSoapBody" calls a method of the Apache AXIS software to populate the parameters of the call. At line 19, "call.invoke (sbElements)" goes through Apache AXIS software to remotely invoke the web method. The remainder of the above "invokeDocument" method takes the result of the invocation of the remote method and converts the result back into database format.

The overall flow of the "invokeRPC" method is essentially the same as the above "invokeDocument" method. However, the "invokeRPC" method is somewhat more complicated because of the need to perform data type conversions. The "invokeRPC" method of the "ase2operation" class is as follows:

```
1:   private opReturn invokeRPC (Object[] args) throws Exception
2:   {
3:       Object webMethodReturn = null;
4:       opReturn toReturn = null;
5:
6:       if (args != null)
7:       {
8:           Object[] allArgs = fillArgs (args);
9:
10:          int numOutputArgs = allArgs.length – args.length;
11:          int numInputArgs = args.length;
12:
13:          webMethodReturn = invokeWebMethodStub (args);
14:          //continued below
```

In the above "invokeRPC" method, an initial call is made to a "fillArgs" routine as provided at line 8. If there are any specific changes that need to be made to the data received with the SQL statement for input to the input method, this "fillArgs" method converts the data to the appropriate data type that the web method is expecting. For example, the WHERE clause of the SQL statement may have data in a string format. This "fillArgs" method converts the string to the appropriate data type that the web method is expecting (e.g., an int).

Once the input arguments have been completed, a call is made to an "invokeWebMethodStub" routine which actually calls the web method. However, because in this case an "RPC" method is being called, the procedure for calling the web method using the Apache AXIS software is different than in the case of the above "invokeDocument" method. The following "invokeWebMethodStub" method of the "ase2operation" class illustrates the manner in which the remote method of the web service is called:

```
1:   private Object invokeWebMethodStub (Object[] args)
2:       throws ClassNotFoundException, InvocationTarget
Exception,
IllegalArgumentException,
3:       IllegalAccessException, InstantiationException
4:   {
5:       Object toReturn = null;
6:
7:       URLClassLoader jarLoader = _wsdlEntry.getJarLoader
( );
8:       String locatorClassName =
_serviceEntry.getServiceJavaName ( )
9:       + "Locator";
10:      Class locatorClass = Class.forName (locatorClass
Name, true,
jarLoader);
```

```
11:     Object locatorObject = locatorClass.newInstance
( );
12:
13:     // Execute getPort method.
14:     String getStubMethodName = "get" +
_serviceEntry.getPortName ( );
15:
16:     Method getStubMethod = null;
17:     Method[] allMethods = locatorClass.getMethods (
);
18:
19:     for (int ii = 0; ii < allMethods.length; ii++)
20:     {
21:         if (allMethods[ii].getName ( ).compareToIgnore
Case
(getStubMethodName)
22:             == 0)
23:         {
24:             getStubMethod = allMethods[ii];
25:             break;
26:         }
27:     }
28:
29:     Object stubObject = getStubMethod.invoke (locatorObject,
null);
30:     Class stubClass = stubObject.getClass ( );
31:
32:     // Find webmethod of name _Operation.getName
( );
33:     Method webMethod = null;
34:
35:     allMethods = stubClass.getMethods ( );
36:
37:     for (int ii = 0; ii < allMethods.length; ii++)
38:     {
39:         if (allMethods[ii].getName ( ).compareToIgnore
Case
(_Operation.getName ( ))
40:             == 0)
41:         {
42:             webMethod = allMethods[ii];
43:             break;
44:         }
45:     }
46:
47:     // Invoke web method.
48:     toReturn = webMethod.invoke (stubObject, args);
49:
50:     return (toReturn);
51: }
```

The actual invocation of the web method is shown at the end of the above "invokeWebMethodStub" routine. Specifically, the call to invoke the web method ("webMethod.invoke") is shown above at line 48. The prior portion of the above routine is responsible for determining the correct method to invoke. The reason for doing so is that a java method is needed to invoke each and every RPC encoded web method. The appropriate Apache AXIS-generated Java method to be used for calling a particular web method must be located before the web method is called.

Once the web method has been called, at line 50 the method returns back to the above "invokeRPC" method. After returning to the "invokeRPC" method, the following portion of the "invokeRPC" method processes any result received from the invocation of the web method:

```
1:  //invokeRPC -- continued
2:      int numParams = 0;
3:
4:      toReturn = new opReturn ( );
5:      if (_returnParameter != null)
6:      {
7:          numParams = 1;
8:          toReturn.desc = new SrvDataFormat[numOutputArgs
+ 1];
9:          toReturn.data = new Object[1][numOutputArgs + 1];
10:     }
11:     else
12:     {
13:         toReturn.desc = new SrvDataFormat[numOutputArgs];
14:         toReturn.data = new Object[1][numOutputArgs
];
15:     }
16:
17:     int tempParamIndex = 0;
18:     ase2parameter tempParam;
19:     int count = 0;
20:
21:     if (_OutputParameters != null)
22:     {
23:         numParams += _OutputParameters.size ( );
24:         for (; count < _OutputParameters.size ( ); count
++)
25:         {
26:             tempParam = (ase2parameter)
_OutputParameters.get (count);
27:             toReturn.desc[count] =
tempParam.getSrvDataFormat ( );
28:             toReturn.data[0][count] = tempParam.convert
(allArgs[numInputArgs + count]);
29:             tempParamIndex++;
30:         }
31:     }
32:
33:     // Now handle the return arg, if one exists.
34:     if (_returnParameter != null)
35:     {
36:         toReturn.desc[tempParamIndex] =
_returnParameter.getSrvDataFormat ( );
37:         toReturn.data[0][tempParamIndex] =
_returnParameter.convert (webMethodReturn);
38:     }
39: }
40: else
41: {// We have to have some args or we bail out.
42:     // This may turn into a hack for the optimizer.
43: }
44: return (toReturn);
45: }
```

The "SrvDataFormat" object shown above (e.g., at line 8) is an object that holds the mapping from a SOAP object back into database (ASE) datatypes. In other words, the "SrvDataFormat" object defines what the data format should be. The actual conversion is performed by a method called "convert" of the "ase2parameter" class (e.g., as shown at line 28 above). This "convert" method transforms the parameters of the web method into the appropriate database format.

The remainder of the above "invokeRPC" method handles all of the output parameters and the return parameters (if any). The conditional statements are included (e.g., the "if" statement at line 34) because some web methods have output parameters, some have return parameters, some have both output and return parameters, and some have no return or output parameters. The result of the above operations are that the XML output of the web method is converted into an appropriate database (ASE) result set.

Once the return and output parameters have been processed, the method returns to the "invoke" method as provided at line 44. The data that is returned by the "invokeRPC" or "invokeDocument" methods (i.e., the result of the invocation of the web method in database format) is then sent back to the database server (ASE). The database server may then provide the response back to the database client (e.g., isql client) that submitted the SQL statement.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for performing database operations on data obtained from a web service, the method comprising:
    creating at least one proxy table in a database, each proxy table mapping to a method of the web service, wherein said at least one proxy table is automatically created based on a Web Services Description Language (WSDL) description of the web service;
    automatically generating meta data about the mapping and storing the meta data in a database table of the database;
    creating a shadow table in the database associated with the web service;
    in response to a database operation on a particular proxy table, using the meta data for converting the database operation into a format for invoking a particular method of the web service based upon the corresponding mapping, wherein a row is inserted into the shadow table in response to a database operation including an insert on the particular proxy table;
    invoking the particular method of the web service using data in the shadow table as input parameters for invoking the web service;
    converting results obtained from invoking the particular method into data for use at the database based upon the corresponding mapping;
    performing the database operation on the data at the database to generate a result set; and
    returning the result set in response to the database operation.

2. The method of claim 1, wherein the web service comprises a service remotely available via a network.

3. The method of claim 1, wherein the web service has a Web Services Description Language (WSDL) interface.

4. The method of claim 1, wherein said creating step includes automatically creating said at least one proxy table in response to user input of a WSDL file name of the web service.

5. The method of claim 4, wherein said step of automatically creating said at least one proxy table includes substeps of:
    obtaining the WSDL file of the web service; and
    automatically creating said at least one proxy table based upon the WSDL file obtained from the web service.

6. The method of claim 1, wherein said automatically generating step includes automatically generating meta data identifying a particular method of the web service to be invoked when a database operation is received on a particular proxy table.

7. The method of claim 1, wherein said creating step includes mapping arguments of the method to fields of the proxy table.

8. The method of claim 1, wherein said creating step includes mapping arguments of the method to equivalent database data types.

9. The method of claim 1, wherein said creating step includes creating an object encapsulating the mapping of a web method to the database.

10. The method of claim 1, wherein said automatically generating step includes storing meta data about the mapping between said at least one proxy table and methods of the web service in a system table of the database.

11. The method of claim 10, wherein said step of converting results includes consulting the mapping for converting the results into data for application at the database.

12. The method of claim 1, wherein the database operation includes a JOIN operation and said step of performing the database operation includes joining data obtained from invoking the particular method of the web service with data stored in the database in generating the result set.

13. The method of claim 1, wherein the step of converting results obtained from invoking the web service includes caching the results in the shadow table of the database associated with the web service.

14. The method of claim 1, wherein said step of performing the database operation includes invoking the particular method of the web service associated with the given proxy table when a column that is an output parameter of the particular method is requested.

15. The method of claim 1, wherein said step of converting the database operation includes creating a Simple Object Access Protocol (SOAP) request for invoking the particular method of the web service.

16. The method of claim 15, wherein said step of invoking the particular method includes transmitting the SOAP request to a remote web service.

17. The method of claim 1, wherein said step of invoking the particular method includes receiving results from the web service.

18. The method of claim 1, wherein said step of converting results includes converting results received in Simple Object Access Protocol (SOAP) format.

19. The method of claim 1, wherein said step of converting results includes converting results received in Extensible Markup Language (XML) format.

20. In a computer connected to a network and having access to a remote service, a system for performing operations at a database on data obtained from the remote service, the system comprising:
    a computer having at least a processor and memory connected to a network and having access to a remote service;
    a mapping module for creating database tables representing at least some methods of the remote service accessed through a defined interface and storing mapping data regarding methods of the remote service in a database system table, wherein said database tables and said mapping data are automatically created based on a Web Services Description Language (WSDL) interface of the remote service;
    at least one shadow table in the database associated with the remote service;
    an invocation module for converting a database operation on a database table representing a method of the remote service into a call for invoking the method using the mapping data, wherein said invocation module inserts a row into the shadow table when an operation including an insert is received on a given database table representing a method of the web service and subsequently uses data in the shadow table to provide input parameters for invoking the method of the web service;
    a communication module for transmitting the call for invoking the method to the remote service, and returning result values from invoking the method to the database; and
    a conversion module for converting result values received from the method into database format, performing the database operation on the converted result values to generate a database result set, and returning the database result set in response to the database operation.

21. The system of claim 20, wherein the remote service comprises an application available via a network.

22. The system of claim 20, wherein said database tables are automatically created in response to user input of a file name of the Web Services Description Language (WSDL) interface.

23. The system of claim 22, wherein said mapping module creates a shadow table in the database associated with the web service.

24. The system of claim 23, wherein said invocation module inserts a row into the shadow table associated with the web service a when an operation including an insert is received on a given database table representing a method of the web service.

25. The system of claim 24, wherein said invocation module uses data in the shadow table to provide input arguments for invoking the method of the web service.

26. The system of claim 23, wherein said invocation module invokes the method of the web service associated with the given database table when a column that is an output parameter of the method is requested.

27. The system of claim 20, wherein said mapping module creates an object encapsulating the mapping of a method of the remote service to a database table.

28. The system of claim 20, further comprising:
a mapping repository for storing mapping data regarding mappings between database tables and methods of the remote service in the database system table.

29. The system of claim 28, wherein the conversion module consults the mapping repository for converting result values into database format.

30. The system of claim 20, wherein the operation received on the database table comprises a JOIN operation and said conversion module joins result values obtained from invoking the method with data stored in the database.

31. The system of claim 20, wherein said invocation module binds the data from the operation to a Simple Object Access Protocol (SOAP) call for invoking the method of the remote service.

32. The system of claim 20, wherein said invocation module converts data from the database operation into Extensible Markup Language (XML) format.

33. The system of claim 20, wherein said invocation module creates a Simple Object Access Protocol (SOAP) request for invoking the method of the remote service.

34. The system of claim 33, wherein said communication module sends the SOAP request to the remote service.

35. The system of claim 20, wherein said conversion module converts result values received in Simple Object Access Protocol (SOAP) format into database data types.

36. The system of claim 20, wherein said conversion module converts result values received in Extensible Markup Language (XML) format into database data types.

37. The system of claim 20, wherein said database operation received by the invocation module comprises a database query received from a user and said conversion module returns a database result set to the user in response to said database query.

38. In a database system, a method for performing database queries on data available from an application, the method comprising:
establishing communication between a database and an application having an interface;
creating database tables to represent at least some functions of the application based on the interface, each database table mapping to a corresponding function of the application, wherein said database tables are automatically created based on a Web Services Description Language(WSDL) interface of the application, and each of said database tables having an associated shadow table;
automatically generating meta data about the mapping and storing the meta data in a system table of the database;
in response to a database query received on a database table corresponding to a function of the application that includes an insert operation on the database table, inserting a row into the shadow table associated with the database table;
generating input arguments expected by the function based on the database query, the mapping meta data and data from the shadow table;
invoking the function with the input arguments and receiving results from invoking the function;
converting the results into a database result set; and
returning the database result set in response to the database query.

39. The method of claim 38, wherein said step of invoking the function includes storing the results in the shadow table associated with the database table.

40. The method of claim 38, wherein said step of invoking the function includes invoking the function associated with the given database table when a column that is an output parameter of the function is requested.

41. The method of claim 38, wherein said automatically generating step includes automatically generating meta data identifying a particular function to be invoked when an operation is received on a given database table.

42. The method of claim 38, wherein said step of creating database tables includes mapping arguments of a given function to columns of the corresponding database table.

43. The method of claim 38, wherein said step of invoking the function includes binding data from the database query to a Simple Object Access Protocol (SOAP) call.

44. The method of claim 38, wherein said step of invoking the function includes converting data from the database query into Extensible Markup Language (XML) format.

45. The method of claim 38, wherein said step of invoking the function includes creating a Simple Object Access Protocol (SOAP) request for invoking the function.

46. The method of claim 45, wherein said step of invoking the function includes transmitting the SOAP request to a remote server.

47. The method of claim 38, wherein said step of invoking the function includes receiving results in Extensible Markup Language (XML) format.

48. The method of claim 38, wherein said step of invoking the function includes receiving results in Simple Object Access Protocol (SOAP) format.

49. The method of claim 38, wherein said step of converting the results includes converting results received in Simple Object Access Protocol (SOAP) format.

50. The method of claim 38, wherein said step of converting the results includes converting results received in Extensible Markup Language (XML) format.

* * * * *

UNITED STATES PATENT AND TRADEMARK OFFICE
CERTIFICATE OF CORRECTION

PATENT NO. : 8,005,854 B2
APPLICATION NO. : 10/707471
DATED : August 23, 2011
INVENTOR(S) : Chawla et al.

Page 1 of 1

It is certified that error appears in the above-identified patent and that said Letters Patent is hereby corrected as shown below:

Column 57, line 12, replace "service a when an operation" with --service when an operation--.

Signed and Sealed this
Thirty-first Day of January, 2012

David J. Kappos
*Director of the United States Patent and Trademark Office*